United States Patent
Aoyama

Patent Number: 5,285,044
Date of Patent: Feb. 8, 1994

[54] PROJECTION WELDING

[76] Inventor: Yoshitaka Aoyama, 20-11, Makitsukadai 2-cho, Sakai-shi, Osaka 590-01, Japan

[21] Appl. No.: 776,047
[22] Filed: Oct. 16, 1991

[30] Foreign Application Priority Data

Oct. 19, 1990 [JP] Japan ................. 2-282944

[51] Int. Cl.$^5$ ............................................. B23K 11/00
[52] U.S. Cl. ................................... 219/93; 219/117.1
[58] Field of Search ................... 219/93, 94, 117.1

[56] References Cited

U.S. PATENT DOCUMENTS 2,731,535  2/1956  Grey.
2,903,562  9/1959  Emmons et al. ................. 219/93

FOREIGN PATENT DOCUMENTS 1-249274  10/1989  Japan.
1-266974  10/1989  Japan.
1-299781  12/1989  Japan ........................... 219/93
1-306079  12/1989  Japan ........................... 219/93

Primary Examiner—Clifford C. Shaw
Attorney, Agent, or Firm—Nikaido, Marmelstein, Murray & Oram

[57] ABSTRACT

A welding method and apparatus in which a hollow positioning guide pin (7) is installed upon an electrode (8) to project through an aperture in a plate (1), whereupon a flanged elongate or slender part (4) is inserted in the guide pin, and as another electrode (15) presses the flange, the guide pin is withdrawn from the aperture.

15 Claims, 2 Drawing Sheets

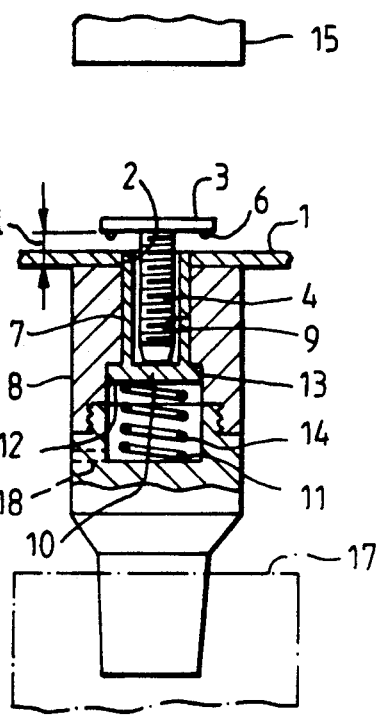
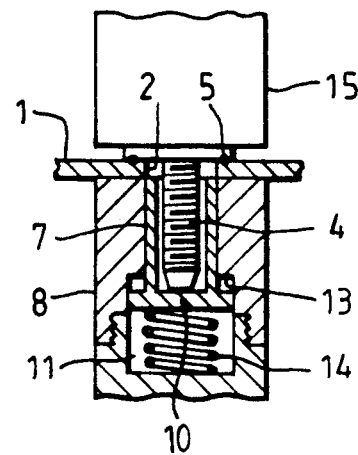
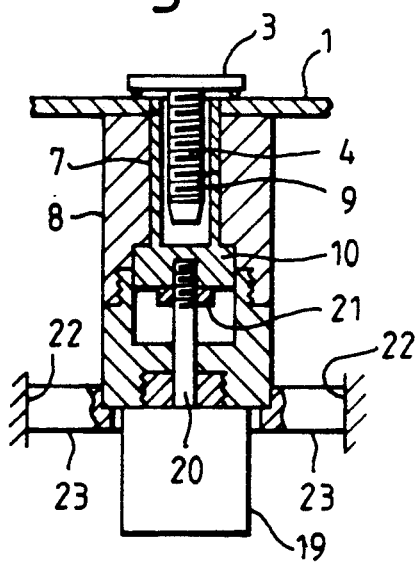
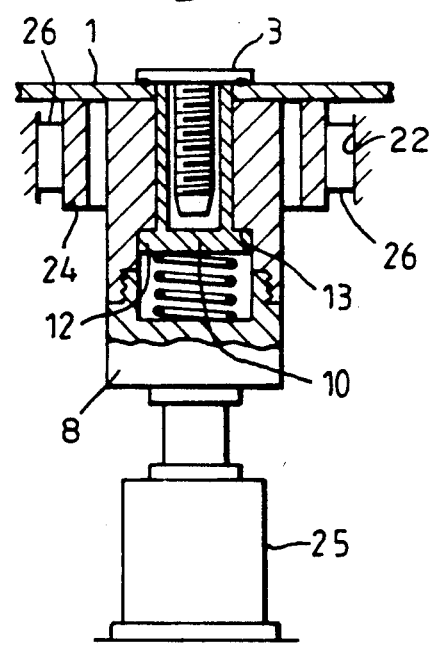

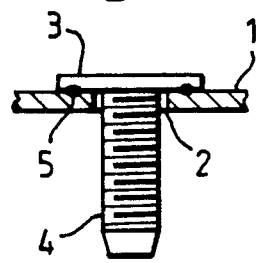
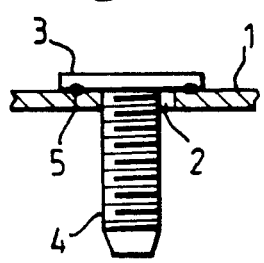
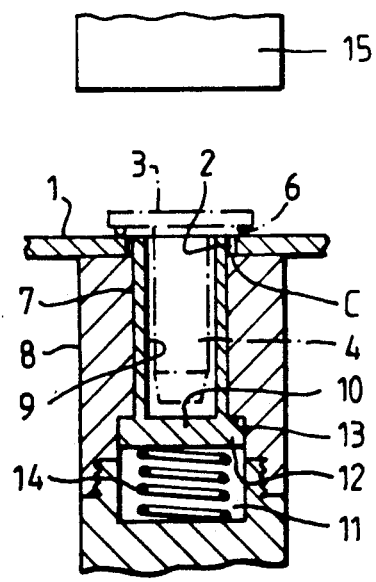
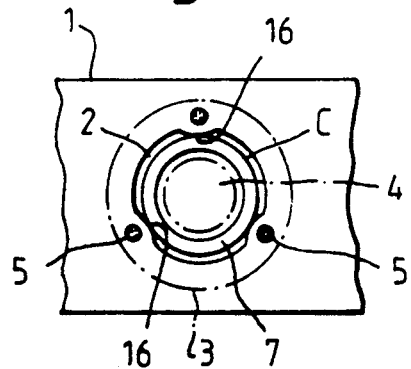

PROJECTION WELDING

FIELD OF THE INVENTION

This invention is concerned with welding attachment or jointing of elements between welding electrodes, and in particular the fixing or mounting by so-called 'projection welding' of an elongate or slender part, such as a flanged bolt or other fastener, to a mounting plate, for example of steel, as used in automobile construction. As such, the invention is effectively utilized where a slender part is inserted in an aperture in a steel plate part or the like after it has been supported upon an electrode.

By way of background information, a related phenomenon will now be described with reference to FIGS. 5 through 8 of the corresponding diagrammatic and schematic drawings, depicting a background related art example.

A metal (eg steel) plate part 1 is formed with an aperture 2, through which is passed an elongate or slender part 4 having a flange or head 3 (such as the bolt shown, or another fastener). The flange 3 and the metal plate 1 are then welded together in localised weld regions 5, by the compression and heat melting or fusion of circumferentially-spaced contact projections 6 formed on the underside of the flange 3 (see FIG. 7), when an electric current is passed therethrough.

FIG. 5 shows the 'normal' or desired case, where the plate aperture 2 is concentric with the bolt 4, but FIG. 6 shows an 'abnormal' or undesirable case, where the bolt 4 is eccentrically positioned, deviating to one side of the aperture 2.

To prevent such eccentricity of FIG. 6, a construction shown in FIG. 7 has been proposed—in which a hollow guide pin 7 is slidably inserted within a guide hole 9 in a fixed electrode 8, with the bottom plate 10 of the guide pin 7 disposed in a spring chamber 11, and abutting a coil spring, effectively biassing the guide pin 7 upwards.

The bottom plate 10 is greater than the diameter of the guide pin 7 and its larger diameter portion 12 abuts the upper surface 13 of the spring chamber 11, thereby limiting the upward travel of the guide pin 7.

The compression of a coil spring 14 disposed in the spring chamber 11 helps to effect this abutment and in this condition the upper end of the guide pin 7 projects above the upper surface of the fixed electrode 8 by an amount corresponding to the thickness of the metal plate 1.

Although the lateral clearance c between the aperture 2 and the guide pin 7 is designed to be as small as possible to improve accuracy, it is depicted as a larger clearance in FIGS. 7 and 8 for clarity of illustration.

Further, the difference in the inner diameter between the bolt 4 and the guide pin 7 is also designed to be as small as possible to improve accuracy.

In FIG. 7, the metal plate 1 is placed on the fixed electrode 8, with the guide pin 7 passed through the aperture 2 and with the bolt 4 inserted in the guide pin 7. A movable (upper) electrode 15 will then be lowered and an electric current passed therethrough to complete projection welding.

When the welding is completed in the manner just described, the circumferentially-spaced welded regions 5 are formed by melting the projections 6 and their localised contact regions with the metal plate 1 as they are pressed together At the inner peripheral regions of the aperture 2 adjacent the welded regions 5, bulges 16 deviating toward the center are formed.

Therefore, when it is desired to withdraw the integrated (i.e. by welding) article shown in FIG. 5 from the fixed electrode 8, upon completion of welding, it cannot be smoothly detached, since either the bulges 16 are in contact with the outer peripheral surface of the guide pin 7 or since the clearance c is very small and has been effectively reduced by the bulges 16.

If it is possible to raise the article precisely axially of the guide pin 7, then it may be detached, even if the clearance c is very small. However, in practice it is very difficult for an operator to raise it precisely axially.

If it should be raised at all obliquely, the inner peripheral surface of the aperture 2 interferes with the outer peripheral surface of the guide pin, making it difficult to withdraw the article.

The bulges 16 in FIG. 8 are also depicted exaggerated in size, for ease of understanding. Actually, the clearance is extremely small and sometimes the bulges 16 are hardly discernable by the naked eye.

SUMMARY OF THE INVENTION

The present invention addresses the problems described above and in one of its aspects provides a welding method characterized in that a hollow positioning guide pin 7 is installed upon an electrode 8 to project through an aperture in a plate 1, whereupon a flanged elongate or slender part 4 is inserted in the guide pin, and as another electrode 15 presses the flange, the guide pin is withdrawn from the aperture.

Another aspect of the invention provides a welding apparatus characterized in that a hollow positioning guide pin 7 is installed upon an electrode 8 to project through an aperture 2 in a plate 1, the guide pin having a closed end 10 and the inside length of the pin being less than the length of an elongate or slender part to be inserted therein, to achieve guide pin displacement with pin travel.

A further aspect of the invention provides a welding apparatus characterized in that a hollow positioning guide pin 7 is installed upon an electrode to 8 to project through an aperture 2 in a plate 1, the guide pin being connected to a traction mechanism 19,25 for movement ahead of the travel of an elongate or slender part inserted therein.

Yet another aspect of the invention provides a welding method adapted for attaching an elongate element to a plate 1 with an aperture 2 to receive a shank 4 of that elongate element and a surface for localised contact welding 5 with a flange 3 of that elongate element, the method comprising the steps of locating a hollow guide tube 7 in alignment with the plate aperture, to receive the shank of the elongate element, inserting the shank through the plate aperture into the guide tube, and passing welding current between the abutting flange and plate through respective contact electrodes 8,15 and withdrawing that guide tube upon initiating of fusion welding contact between the flange of the elongate element and the plate surface.

A still further aspect of the invention provides a welding apparatus adapted for contact fusion welding together a flanged shank element 3,4 and an apertured or perforated plate element 1, the apparatus comprising a hollow support electrode 8, incorporating a movable guide tube 7, to support a plate, and a spaced electrode to contact a flanged shank element to be fitted within an aperture 2 in the plate, the guide tube being adapted for alignment with a plate aperture and thereafter to receive the shank, whereby to align it with the plate aperture, the electrodes being relatively movable, to compress the flange and plate into fusion welding contact upon the passage of an electric current therebetween, and upon that relative electrode movement the movable guide being withdrawn progressively from the shank, to facilitate subsequent removal of the welded shank flange and plate from the support electrode.

DESCRIPTION OF THE DRAWINGS

There now follows a description of some particular embodiments of the invention, by way of example only, with reference to the accompanying diagrammatic and schematic drawings, in which:

FIGS. 1 through 4 show side views, partially in longitudinal section, showing various embodiments of the present invention; specifically:

FIG. 1 shows a movable guide pin arrangement for a projection welding electrode assembly before welding;

FIG. 2 shows the FIG. 1 arrangement after welding;

FIG. 3 shows an alterative movable guide pin arrangement; and

FIG. 4 shows a further movable guide pin arrangement;

FIGS. 5 through 7 are side views in longitudinal section;

FIG. 5 shows a centralized flanged bolt and plate aperture welded fixing;

FIG. 6 shows an eccentric bolt and plate fixing;

FIG. 7 shows a projection welding electrode assembly incorporating a guide; and

FIG. 8 is a plan view showing weld distortions attending the fixing of FIGS. 5, 6 and 7.

DESCRIPTION OF THE PREFERRED EMBODIMENTS

For succinctness of explanation, in the embodiments shown in FIGS. 1 through 4, the corresponding members to those previously described in the background art example of FIG. 8 are denoted by the same reference characters, but their description will not be repeated Further, in the embodiment figures, the clearance between the bolt and the guide pin is shown enlarged Firstly, referring to an embodiment shown in FIGS. 1 and 2, the guide pin 7 has a bottom plate 10. Its inside length (the length of the through hole) is less than the length of the bolt 4, the difference being approximately equal to the thickness of the metal plate part 1, i.e. to (the initial flange 3 to plate 1 separation) '1' in FIG. 1. In addition, the 'fixed' (support) electrode 8 is force-fitted in a base block 17.

In the condition depicted in FIG. 1, when the movable electrode 15 is lowered, the guide pin 7 is depressed by the bolt 4 and the coil spring 14 is displaced towards the lower region in the spring chamber 11 while being compressed, whereby the guide pin 7 is withdrawn from the plate aperture 2.

In this embodiment, at the same time as the movable electrode 15 begins to press the flange 3, the guide pin 7 is withdrawn from the aperture 2. Since the projections 6 are in contact with the metal plate part 1 until this withdrawal is completed, there is no danger of the metal plate part 1 deviating towards eccentricity as shown in FIG. 6.

Moreover, instead of using the coil spring 1 of FIG. 1, air pressure may be fed from a supply passage 18 (shown in broken lines).

In the embodiment shown in FIG. 3, it is arranged that the guide pin 7 is pulled down by the force of an air cylinder 19. The piston rod 20 of the air cylinder is threadedly driven into a thick bottom plate 10, with a nut 21 applied thereto to prevent loosening. The fixed electrode 8 is mounted on a strong support block 23 fixed to a stationary member 22. In this embodiment, at the same time as the movable electrode presses the flange 3, the guide pin 7 can be pulled down by the air cylinder 19, or it can be pulled down after the flange 3 is pressed (or after welding is completed).

In the embodiment shown in FIG. 4 the metal plate part 1 is mounted on a support block 24, so that, when the whole of the fixed electrode 8 is pulled down by an air cylinder 25, the guide pin 7 is withdrawn from the aperture 2. This arrangement is of the so-called 'traction mechanism' type. The support block 24 is an annular member surrounding the fixed electrode 8 and firmly fixed to the stationary member 22 through bracket 22. When the hitherto 'fixed' electrode 8 is lowered, the large diameter portion 12 is in intimate contact with the upper surface 13 of the spring chamber In this embodiment, the guide pin 7 is withdrawn after the flange 3 is welded to the metal plate part 1. Though not shown, an arrangement may be used in which, with the fixed electrode of FIG. 4 maintained stationary, the support block 24 is raised.

In addition, the air cylinder in each embodiment has an air hose connected thereto, but not illustrated.

In the welding method of the present invention, the guide pin is withdrawn from the plate aperture, either at the same time as, or after, the movable electrode presses the flange of an elongate or slender part. Therefore, when the operator withdraws the assembly of the metal plate part and slender part from the guide pin, the problem described in the prior art example can be completely solved, since the fit relationship between the plate aperture and the guide pin has disappeared.

Further, the arrangement in which the closed-ended guide pin is depressed by a slender part whose length is greater than the inside length of the guide pin, enables retraction of the guide pin from the plate aperture by utilizing the displacement of the movable electrode.

Further, the arrangement in which the fixed electrode is displaced relative to the slender part upon completion of welding makes forcible withdrawal possible.

I claim:

1. A welding method comprising the steps of:
installing a hollow positioning guide pin upon an electrode to project through an aperture in a plate;
inserting a flanged elongate or slender part in said guide pin; and
pressing another electrode to said flange while withdrawing the guide pin from said aperture upon initiation of fusion welding contact between said flange and said plate.

2. A welding apparatus comprising:
a hollow positioning guide pin installed upon an electrode to project through an aperture in a plate, said guide pin having a closed end and an inside length of said guide pin being less than a length of an elongate or slender part to be inserted therein, to achieve guide pin displacement from said aperture with pin travel upon initiation of fusion welding contact between a flange of said elongate or slender part and said plate.

3. A welding apparatus comprising:

a hollow positioning guide pin installed upon an electrode to project through an aperture in a plate;

traction means coupled to said guide pin, said traction means for moving said guide pin in a downward direction from said aperture upon initiation of fusion welding.

4. A welding apparatus as recited in claim 3, wherein said traction means for pulling said guide pin in said downward direction simultaneously with a pressing of a workpiece to said plate.

5. A welding apparatus as recited in claim 3, wherein said traction means for pulling said guide pin in said downward direction after a workpiece has been pressed to said plate.

6. A welding apparatus as recited in claim 3, wherein said traction means for pulling said guide pin in said downward direction after a workpiece is welded to said plate.

7. A welding method adapted for attaching an elongate element to a plate with an aperture to receive a shank of an elongate element and a surface for localized contact welding with a flange of said elongate element, the method comprising the steps of:

locating a hollow guide tube in alignment with said plate aperture, to receive the shank of said elongate element;

inserting the shank through the plate aperture into the guide tube;

passing welding current between abutting flange and plate through respective contact electrodes; and withdrawing said guide tube upon initiating of fusion welding contact between the flange of said elongate element and the plate surface.

8. A welding method as claimed in claim 7, in which one end of the guide tube is disposed initially within the plate aperture and is withdrawn therefrom upon welding, to facilitate subsequent removal of the welded plate and flanged shank from the plate contact electrode.

9. A welding method as claimed in claim 7, in which the guide tube is displaced by engagement with the shank end, upon further travel of the shank after insertion therein, to bring the flange into contact with the plate.

10. A welding method as claimed in claim 7, in which the guide tube is withdrawn ahead of the advancing shank by a synchronised displacement means.

11. A welding apparatus for contact fusion welding together a flanged shank element and an apertured or perforated plate element, the apparatus comprising:

a hollow support electrode, incorporating a movable hollow guide tube, to support a plate; and a spaced electrode to contact a flanged shank element to be fitted within an aperture in said plate, the guide tube being aligned with a plate aperture and thereafter to receive the shank, to align the shank with said plate aperture, the electrodes being relatively movable, the flange and plate are compressed by movement of said electrodes into fusion welding contact upon the passage of an electric current therebetween, and upon compression and initiation of fusion welding contact between said flange and said plate, the movable guide tube being withdrawn from the aperture, to facilitate subsequent removable of the welded shank flange and plate from the support electrode.

12. A welding apparatus as claimed in claim 11, wherein the guide tube is initially upstanding from the support electrode for location of the plate aperture, and when the electrode contacts a circumference of said plate aperture, an open end of the guide tube sits substantially flush with the plate surface, to facilitate insertion of the shank and to allow subsequent contact between the flange and plate.

13. A welding apparatus as claimed in claim 11, in which the flange incorporates a plurality of peripheral depending projections serving as localised initial points of plate contact and forming localised fusion welding points upon melting by the electrode current.

14. A projection welding apparatus as claimed in claim 11, incorporating movement displacement or biassing means for the guide tube.

15. A projection welding apparatus as claimed in claim 14, in which the guide tube movement displacement means comprises a pneumatic cylinder chamber within the hollow plate support electrode, with a closed end of the guide tube as an interfitting piston.

* * * * *